April 4, 1967 H. PRIEBS 3,312,323
FRICTION GEAR DRIVE FOR THE PAPER CARRIAGE
OF A BUSINESS MACHINE
Filed March 22, 1965 5 Sheets-Sheet 1

April 4, 1967 H. PRIEBS 3,312,323
FRICTION GEAR DRIVE FOR THE PAPER CARRIAGE
OF A BUSINESS MACHINE
Filed March 22, 1965 5 Sheets-Sheet 4

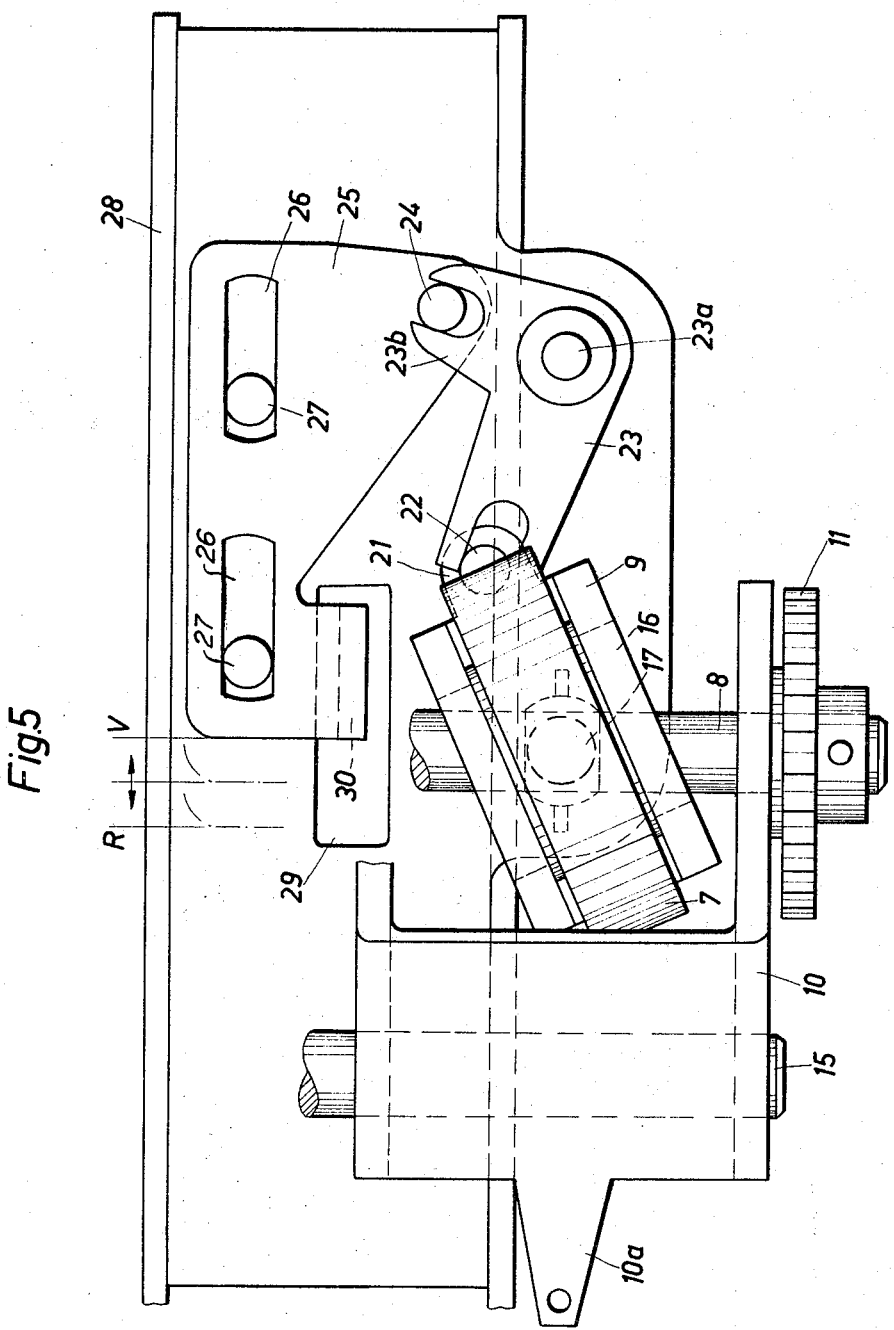

3,312,323
FRICTION GEAR DRIVE FOR THE PAPER CARRIAGE OF A BUSINESS MACHINE
Horst Priebs, Bielefeld, Germany, assignor to Anker-Werke Aktiengesellschaft, Bielefeld, Germany, a corporation of Germany
Filed Mar. 22, 1965, Ser. No. 441,423
Claims priority, application Germany, Mar. 24, 1964, A 45,590
7 Claims. (Cl. 197—176)

My invention relates to a friction gear drive for the paper carriage of typing or printing business machines such as accounting machines. In machines of this type the paper carriage must be displaceable columnwise in the forward and reverse directions.

The reversible drive of a slider or carriage on a linear path, such as the paper carriage of a business machine, has been effected by means of mangle gearings with two racks on diametrically opposite sides of a driven pinion journalled on a pivotally displaceable lever. Such gear mechanisms have the disadvantage that, when starting or reversing the drive, the pinion and rack teeth enter into meshing engagement under impact and thus cause jarring.

It has been attempted to eliminate this by substituting for the spur gear mechanism a friction gear drive having two profiled friction rollers rotating at constant speed in the same sense and selectively engageable with respective parallel mating rails. When the paper carriage is being started, one of the continuously rotating friction rollers is initially coupled with one of the parallel rails with a great amount of slippage which then gradually declines until the speed of the rail, fastened to the paper carriage and driven by the friction roller, has accelerated up to the peripheral speed of the roller. Since the paper carriage, particularly in accounting machines with a platen roller, must be repeatedly transported for each individual accounting operation in the forward and reverse direction or from column to column or also in jumps to skip individual columns, the friction rollers of such slip mechanisms are subjected to great wear and must be exchanged after relatively short time of use, despite the provision or readjusting means.

Another known device avoids the disadvantages of slipping friction rollers by journalling a shaft on the paper carriage and providing the shaft with a coupling member driven by engagement with a motor-driven friction roller. The transmission of driving force is effected by several friction rollers which are arranged parallel to the shaft axis and simultaneously function as guide rollers for the longitudinal displacement of the shaft. The longitudinal motion of the paper carriage is effected with the aid of several friction rollers so journalled as to be angularly displaceable within a housing which encloses the shaft and is designed as a tensioning ring. The friction rollers are driven from the revolving shaft and, when set to an angular position, perform a helical motion on the shaft and relative to the shaft axis. As a result, the shaft is pulled into the stationary housing, and the paper carriage is correspondingly driven in the longitudinal direction.

This device has the disadvantages of occupying much space, requiring frequent readjustments, and suffering excessive wear on account of the fact that such wear occurs on three localities where the three different frictional forces are active. Furthermore, there occurs a relatively high power loss. This is because, on the one hand, the coupling surrounding the shaft is driven by a friction wheel which transmits the torque to the shaft through friction rollers driven by the shaft and extending at a right angle to the rotating motion. On the other hand, a power loss due to frictional forces also results from the fact that those rollers which have fixed journal axes and are pressed against the shaft to cause rotation thereof, are made to rotate during longitudinal motion in order to then serve as guide rollers.

Another deficiency, common to all of the known friction gear drives, is the fact that the frictional forces between the driving and the driven part are often unreliable or not as great as expected, because the friction surfaces do not rest snugly against each other since an accurate parallelism of the mutually engaging surfaces cannot be preserved.

It is an object of my invention to eliminate the disadvantages of the known friction gear drives for longitudinal displacement of paper carriages.

To this end, and in accordance with a feature of my invention, I journal a shaft or several axially aligned shafts on the carriage so as to extend parallel to the longitudinal travel direction of the carriage, and place the shaft or shafts in rotation by means of a friction wheel, whose angle of force engagement is adjustable to effect longitudinal displacement of the carriage; and I secure a satisfactory, snug engagement of the friction wheel with the shaft to be driven by joining the friction wheel Cardanically (universally) with its driving shaft and arranging the friction gear on a bearing structure which is angularly displaceable in opposition to spring force.

These and other features of the invention will be described in detail with reference to an embodiment of a paper-carriage drive according to the invention illustrated by way of example on the accompanying drawings in which:

FIG. 5 is a plan view of the friction-wheel control means of the device.

The illustrated friction gear mechanism serves to move the paper carriage of a typing or printing business machine, particularly an accounting machine, in the forward and reverse direction. The device comprises a carriage guide 1 (FIG. 1) which carries balls 2 on which the base plate 3 of a paper carriage is displaceably seated for longitudinal motion toward and away from the observer relative to FIGS. 1 and 2.

Figure 3:
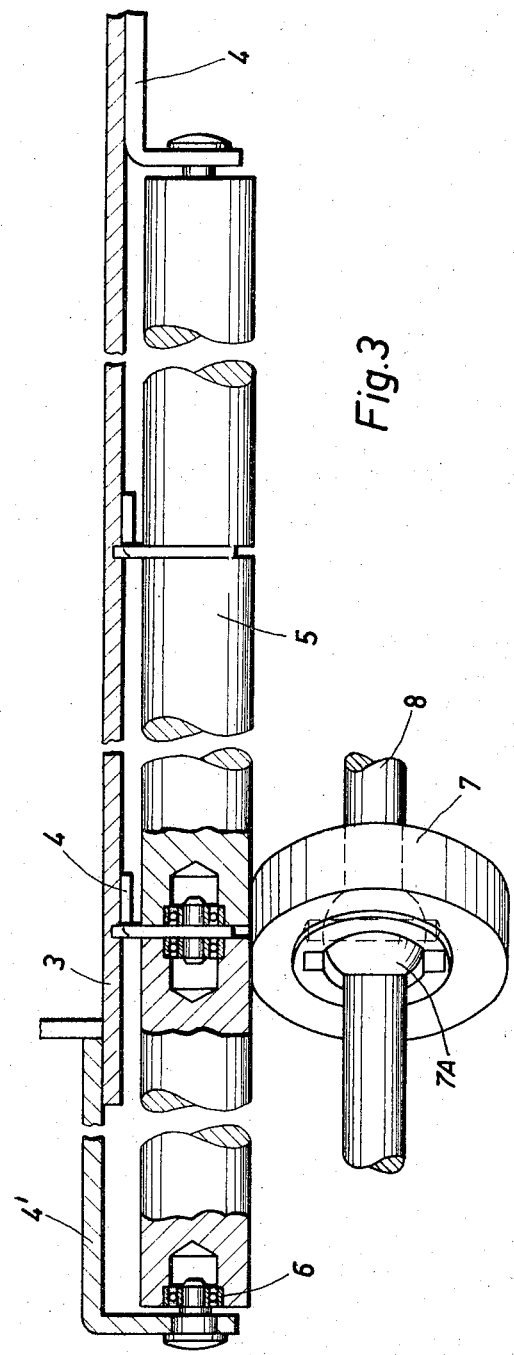
FIG. 3 shows partially and partly in section a paper carriage with the transport shaft and friction wheel during carriage travel.

A number of angle pieces 4 (FIG. 3) are fastened to the base plate 3 of the carriage in longitudinally spaced relation to each other. The terminal angle 4' is attached exterior to base plate 3. One or more transporting shafts 5 aranged axially adjacent each other are journalled on the angles 4, preferably by means of ball bearings 6 so as to be easily rotatable. The transporting shaft 5 forms part of a friction gear drive and is engaged by a friction gear 7.

Figure 1:
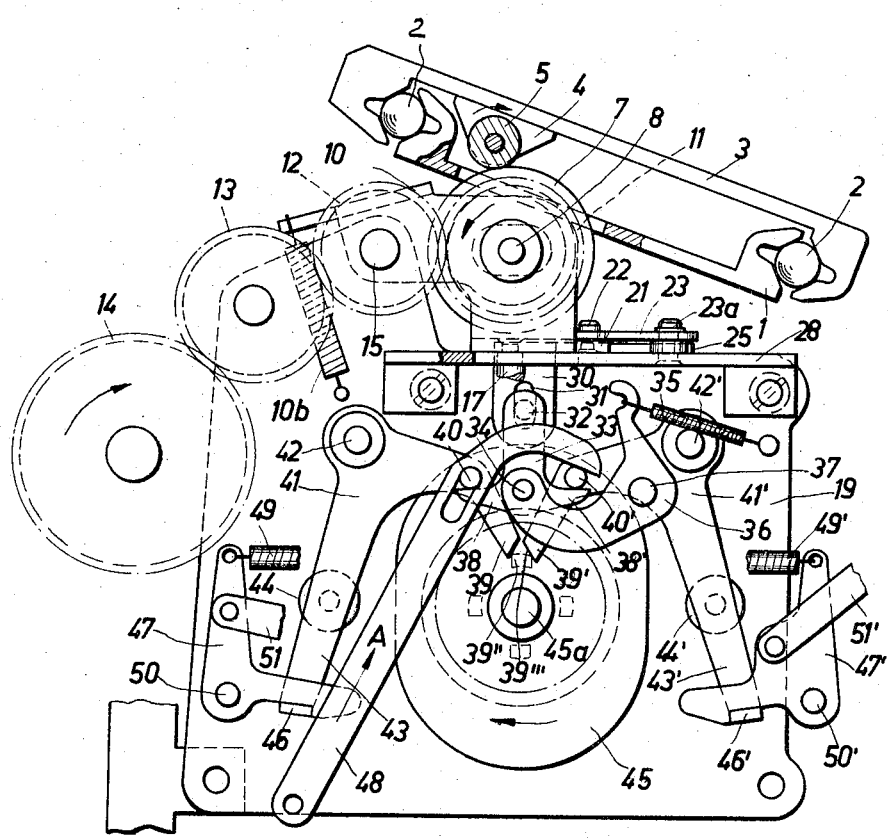
FIG. 1 is a lateral view of the friction gear drive with a control device, the friction wheel being shown positioned to keep the carriage at rest.
Figure 4:
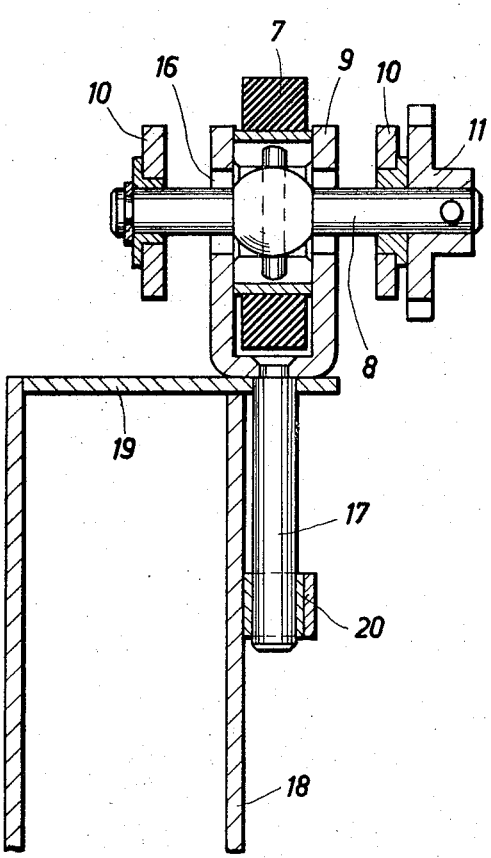
FIG. 4 is a cross section through the mounting of the friction wheel.

The friction gear 7 is Cardanically fastened by a Cardanic mount 7A on a drive shaft 8 (FIG. 3) and is prevented from displacement in the axial direction by the legs of a guiding fork 9 (FIG. 4) mounted for pivotal displacement. The drive shaft 8 is journalled on a bearing bracket 10 which is angularly displaceable in the direction toward the transporting shaft 5 (FIGS. 1, 4, 5). A spur gear 11 is fastened on one end of the drive shaft 8. As shown in FIG. 1, the spur gear 11 meshes with an intermediate gear 12 in mesh with another intermediate gear 13 engaging a main gear 14 driven by a motor. The bearing bracket 10 is mounted on a pivot shaft 15 which also constitutes the shaft for the intermediate gear 12. An extension 10a (FIG. 5) of the bearing bracket 10 is engaged by one end of a pull spring 10b (FIGS. 1, 2) whose other end is stationary. The spring urges the friction wheel 7 in the bracket 10 against the transporting shaft 5 of the paper carriage.

The guiding fork 9 (FIGS. 2, 4, 5) is provided with elongated holes 16 to permit an unhindered swinging movement of the guide fork 9 relative to the drive shaft 8. The guide fork 9 has a pivot shaft 17 (FIG. 4) journalled in a glide bearing 20 which is secured to a support 18 forming part of the housing structure 19 of the device. The foot 21 of the guide fork 9 carries a dog pin 22 which articulately joins the guide fork 9 with a bell-crank lever 23 pivotally mounted on a stationary pin 23a (FIG. 5). The lever 23 has a bifurcated end 23b straddling a pin 24 of a displaceable plate 25. Two aligned holes 26 in plate 25 are engaged by respective guide pins 27 fastened to a fixed plate 28. The plate 28 has a recess 29 through which a lateral lug 30 of the displaceable plate 25 protrudes into the lower portion of the friction gear housing accommodating the control means.

The lug 30 of the displaceable plate 25 has an elongated hole 31 straddling an entrainer pin 32 of a T-shaped double-cam lever 33 (FIG. 1). The cam lever 33 carries a pivot pin 34 linked with a lever 36 which is pivoted on a stationary pin 37 and biased by the pulling force of a spring 35. The legs 38 and 38' of the T-shaped cam lever 33 have their inner edges designed as respective cam contours, and these are engageable by respective dog pins 40 and 40' of two control levers 41 and 41' for controlling the forward and return travel respectively of the paper carriage.

The control lever 41 for forward travel of the carriage is designed as a bell-crank lever. The control lever 41' for the return travel has an analogous design. Both control levers are pivotally secured to the frame structure 19 on respective pins 42 and 42'. The legs of the control levers 41 and 41', correlated to the respective legs 38 and 38' of the T-shaped cam lever 33, have respective extensions 39 and 39' which prevent the cam lever 33 from turning out of its path of motion. The front edges 39'' and 39''' (FIG. 1) of the respective extensions 39 and 39' also block the one control lever 41 or 41' which is not in working position (FIG. 2) at a time, thus forming an interlock which permits only one of the respective control levers 41 and 41' to be placed into switching position.

The downwardly extending legs 43 and 43' (FIGS. 1, 2) of the control levers 41 and 41' are provided with a roller 44 or 44' for cooperating with a cam 45 fastened on a shaft 45a driven by a suitable single-turn clutch, not shown. The free end of each leg 43, 43' has a lateral lug 46 or 46' which forms a catch for engagement by a latch pawl 47, 47'. The dog pins 40 and 40' of respective control levers 41 and 41' are engageable by a pull rod 48 (FIGS. 1, 2) which, when one of the control levers 41 or 41' is in switching position, actuates an electric switch (not illustrated) which energizes the motor of the friction gear drive and simultaneously unblocks the paper carriage transport through non-illustrated levers and pawls.

The latch pawls 47 and 47' are designed as bell crank levers, pivotally mounted on respective stationary pins 50 and 50', and angularly displaceable in opposition to the pulling force of a return spring 49 or 49'. Linked to the latch pawls 47 and 47' are respective control rods 51 and 51' which are connected with non-illustrated tabulator keys and other control elements of the business machine.

The operation of the above-described device is as follows.

Figure 2:
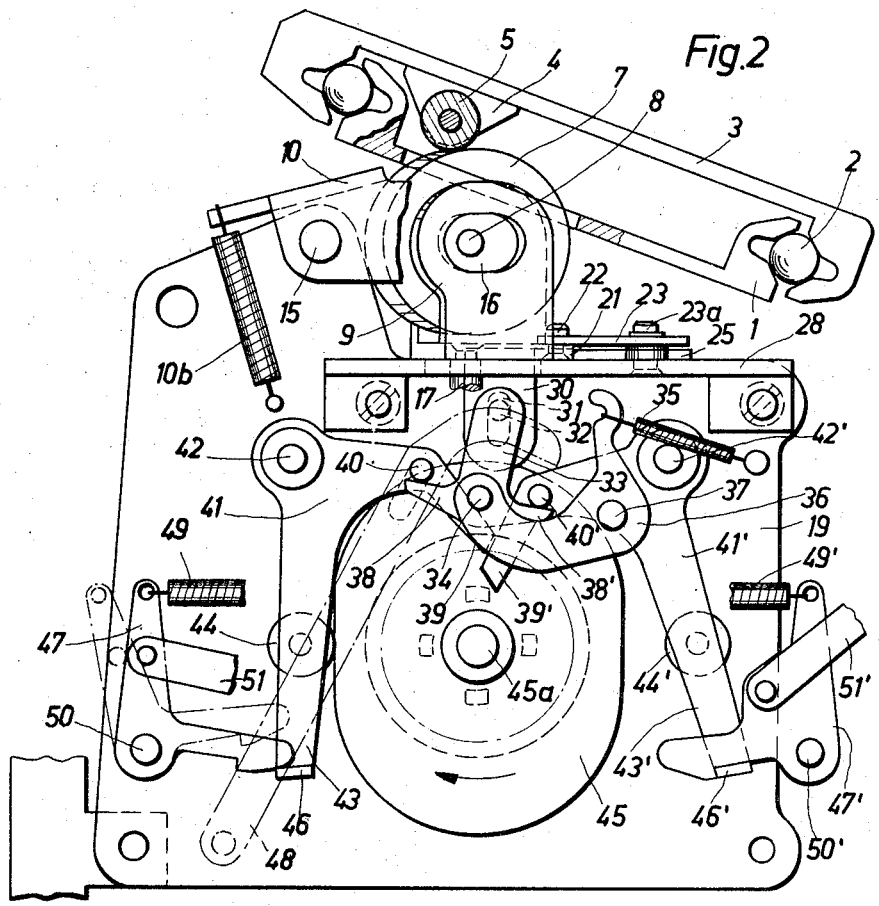
FIG. 2 shows the same view as FIG. 1 but with the friction wheel in a slanting position during forward travel of the carriage.

By depressing a tabulator key, or when during automatic program performance a controlling machine element is being released to initiate a forward travel of the paper carriage, the control rod 51 (FIGS. 1, 2) is shifted to the left so that the latch pawl 47 turns counterclockwise about the pin 50 and releases the lug 46 of control lever 41. Consequently, the dog pin 40 on control lever 41 no longer arrests the cam lever 33 and the lever 36 linked thereto, so that the spring 35 pulls the lever 36 clockwise about its pivot pin 37. Simultaneously, the cam lever 33 turns clockwise about the dog pin 40' of the arrested control lever 41'. The cam contour 38 of the cam lever 33, engaging the dog pin 40, entrains the control lever 41 for the carriage forward travel. Thus the control lever 41 rotates counterclockwise, having its roller 44 in engagement with the cam 45 (FIG. 2). During pivotal movement of the control lever 41, the dog pin 40 simultaneously displaces the pull rod 48 in the direction of the arrow A (FIG. 1), thus switching the drive motor on, so that the main drive gear 14 commences to rotate and drive the shaft 8 through gears 12, 13 and 11. The universally mounted friction wheel 7 now rotates in the direction of the arrow entered on wheel 7 in FIG. 1 and thus causes the transport shaft 5 to revolve on the paper carriage.

Simultaneously with the angular displacement of the control lever 41 by means of the cam lever 33, the entrainer pin 32 in the elongated hole 31 of lug 30 displaces the plate 25 to the right up to the position V (FIG. 5). During such displacement, the bell-crank lever 23 turns clockwise about its pivot 23a, and the guide fork 9 turns counterclockwise as shown in FIG. 5. This places the friction wheel 7 at an angle to the axis of the drive shaft 8 and at an angle to the direction of the shaft 5 on the paper carriage 3. Due to the angular position of the friction wheel 7 relative to the axial direction of the driven transport shaft 5, there is produced a helical motion, and the paper carriage is driven longitudinally in the forward direction until it reaches a stop (not illustrated).

As soon as the paper carriage arrives at the stop for example at a tabulator rider or the like, a run-up and detent pawl releases the single-turn clutch which places the shaft 45a (FIGS. 1, 2) in rotation, shaft 45a being affixed to cam 45 and the clutch, and the roller 44 causes the control lever 41 to be moved clockwise until its lug 46 is caught in the latch pawl 47.

By virtue of this constrained return movement of the control lever 41, its dog pin 40 glides along the cam contour of leg 38 on cam lever 33 and rotates the lever 33 together with the lever 36 counterclockwise to the starting position shown in FIG. 1. Simultaneously the displaceable plate 25 returns to the starting position, this being the mid-position between the positions R and V in FIG. 5. The return displacement of plate 25 causes the friction gear 7 to be moved angularly back to the starting position so that the friction wheel 7 and the transport shaft 5 no longer impart longitudinal motion to the paper carriage.

At the termination of the above-described movements, the pull rod 48 acts upon the motor control switch (not illustrated) to stop the main drive gear 14 so that the friction wheel 7 is also stopped.

When the control device is actuated by means of the control rod 51', the above-described operations are analogously released by the control lever 41' for carriage return travel, so that the displaceable plate 25 is shifted to the position R. In this case the friction wheel 7 is set to the opposite angle relative to the axis of the transport shaft 5 mentioned in the foregoing, and the driving force imparted to the carriage is in the reverse direction.

To those skilled in the art it will be obvious upon a study of this disclosure that friction gear drives for paper carriages according to the invention may be modified in various respects and may be given embodiments other than particularly illustrated and described herein, without daparting from the essential features of my invention and within the scope of the claims annexed hereto.

I claim:

1. With a paper carriage for business machines having shaft means journalled on the carriage and extending parallel to the carriage travel direction, in combination, a device for driving the carriage comprising a friction wheel drivingly engageable with said shaft means for imparting rotation thereto, a drive shaft resiliently journalled in parallel relation to said shaft means, a Cardanic mount fastening said wheel on said drive shaft, and control means for setting said wheel on said drive shaft at an angle to the axis of said shaft means.

2. A driving device for a paper carriage of a business machine, wherein said carriage has rotatable shaft means extending parallel to the carriage travel direction, comprising a friction wheel peripherally engageable with said shaft means, a drive shaft resiliently journalled in parallel relation to said shaft means, a Cardanic joint mounted concentrically within said wheel and fastening it to said drive shaft, and control means for setting said wheel on said drive shaft at an angle to the axis of said shaft means, said control means comprising a guide fork straddling said wheel and rotatable about an axis extending substantially at a right angle through the axis of said drive shaft at the center of said joint.

3. In a driving device for a paper carriage according to claim 1, said control means comprising a guide fork straddling said wheel and rotationally movable about a pivot axis extending at a right angle to the axis of said drive shaft, displacing means linked to said guide fork for angularly setting said fork about said pivot axis, a double-cam member connected with said displacing means and having respective cam means for selectively moving said cam member in opposite directions to cause said displacing means to set said fork for forward and return travel of the carriage respectively, and two movable control members adapted to be selectively actuable coactive with said respective cam means of said double-cam member for controlling said cam member.

4. In a driving device for a paper carriage according to claim 3, said two movable control members consisting of two control levers having respective dog pins engageable with said cam means of said double-cam member for effecting forward and return carriage movements respectively, and said two control levers forming an interlock which blocks one of them when the other is actuated.

5. In a driving device for a paper carriage according to claim 3, said control means comprising a rotatable cam mechanism, and said control members having respective resetting means engageable by said rotatable cam for returning the actuated control lever back to the starting position.

6. In a driving device for a paper carriage according to claim 3, said two control members consisting of respective control levers having respective dog pins engageable with said cam means of said double-cam member for affecting forward and return carriage travel respectively, respective roller means on each of said control levers respectively, a rotatable cam mechanism engageable with said roller means for returning the actuated control lever back to the starting position.

7. In a driving device for a paper carriage according to claim 6, said control levers having respective catch means, two spring-biased latch pawls respectively engageable with said respective catch means for normally retaining said respective control levers in inactive position, and two release members adapted to be selectively actuated, said release members being linked to said respective latch pawls for selectively releasing one of them to cause operation of the corresponding one of said control levers.

References Cited by the Examiner

UNITED STATES PATENTS

| 560,163 | 9/1896 | Heath | 197—114 X |
| 1,070,732 | 8/1913 | Raschen | 197—89 X |

FOREIGN PATENTS

| 80,812 | 5/1963 | France. |
| 550,338 | 10/1956 | Italy. |

ROBERT E. PULFREY, *Primary Examiner.*

DAVID KLEIN, *Examiner.*

E. T. WRIGHT, *Assistant Examiner.*